Oct. 20, 1942.   W. H. CLARK   2,299,611
PRESSURE ACCUMULATOR
Filed June 3, 1942
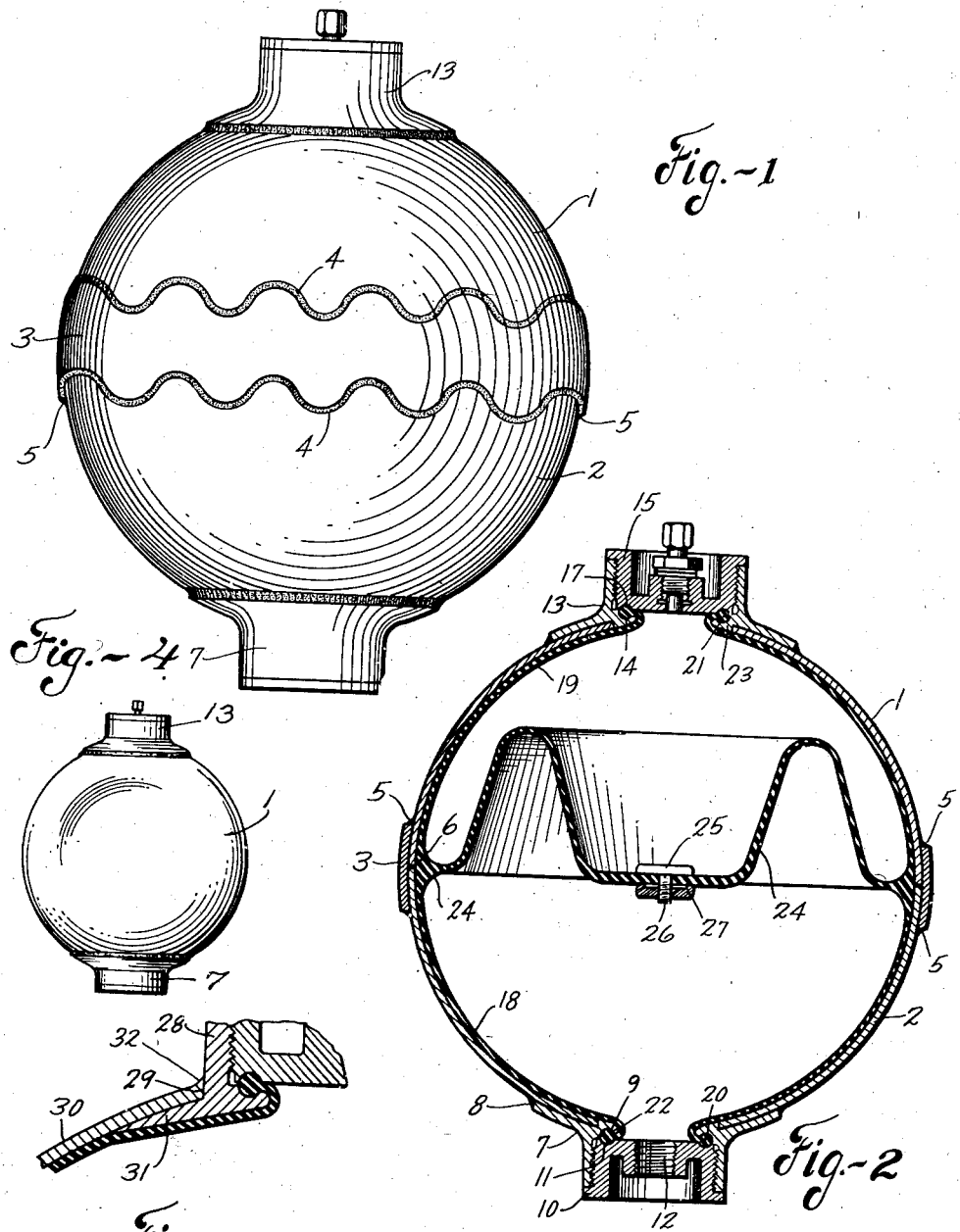
Warren H. Clark
INVENTOR
BY C. B. Stevens
ATTORNEY Patented Oct. 20, 1942

2,299,611

UNITED STATES PATENT OFFICE 2,299,611

PRESSURE ACCUMULATOR

Warren H. Clark, Glendale, Calif., assignor to United Aircraft Products, Inc., Dayton, Ohio, a corporation of Ohio Application June 3, 1942, Serial No. 445,669

8 Claims. (Cl. 138—30)

This invention pertains to a pressure accumulator of the type normally used as a storage means for hydraulic flow pressure, wherein the pressure is utilized under suitable valve control means for operating or actuating various movable parts.

The invention is particularly adapted for use on aircraft wherein fluid pressure stored in an accumulator is utilized to actuate pistons which, in turn, operate the wing flaps, rudder, retractable landing gear, and other parts of a plane from a point of central control such as the pilot's space.

Heretofore, pressure accumulators of the type herein disclosed have consisted of two half shells movably secured together by radially extending flanges and bolts, or by other means, in order to provide a fluid tight reservoir for the storage of fluid under pressure. Such pressure accumulators have embodied two separate compartments formed by a flexible diaphragm extending laterally across the center of the reservoir, one of these compartments being adapted to receive a liquid under pressure and the other compartment being adapted to receive air under pressure, the air being utilized to eject the fluid under pressure from its compartment and into operative relation with the part to be operated thereby. Accumulators as just described have required accurate and particular assembly of the half shells and an effective seal at the point of jointure of the half shells, and have also required leak tight metallic half shells in order to confine the pressure in the reservoir formed thereby.

It is an object of the invention to provide a pressure accumulator which is capable of being economically manufactured; efficient in use; economical in operation; automatic in action; possessed of a minimum of parts, and unlikely to get out of repair.

It is another object of the invention to provide a pressure accumulator of such nature that the half shells comprising the pressure reservoir may be easily and quickly assembled and secured together as by means of welding.

It is another object of the invention to provide a pressure accumulator of such nature that the half shells going to make up the reservoir may be permanently secured together so as to virtually constitute a one-piece structure.

It is another object of this invention to provide a pressure accumulator wherein the diaphragm separating the pressure reservoir into two pressure compartments may be collapsed and easily and quickly removed for renewal, or repair, without disassembling the half shells.

It is another object of this invention to provide a combined liner and separating diaphragm for the pressure receiving reservoir of the accumulator which may be easily removed for repair or replacement as a unit, and in a single operation.

A further object of the invention is to provide a pressure accumulator having the advantageous features and meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described and illustrated in the accompanying drawing.

In the drawing wherein is illustrated the preferred but obviously not necessarily the only form of embodiment of the invention, Fig. I is an elevational view of a pressure accumulator constructed in accordance with the ideas disclosed in this invention.

Fig. II is a vertical sectional view of the pressure accumulator shown in Fig. I.

Fig. III is a fragmentary detail sectional view showing a modified form of arrangement for the pressure inlet and outlet to and from the accumulator pressure reservoir, and Fig. IV is an elevation of a modified form of reservoir.

Like parts are indicated by similar characters of reference throughout the several views.

In the use of the pressure accumulator of the type herein disclosed the area on one side of the diaphragm, which separates the pressure chamber into two separate compartments, is normally filled with air under pressure, and the area on the opposite side of the diaphragm is filled with a liquid under pressure. As needed, the liquid under pressure is allowed to escape from the pressure accumulator under the control of suitable valve means and to flow to, for example, a piston for the purpose of actuating the piston and the part to be operated by the piston movement. As the liquid is permitted to escape, the air under pressure on the opposite side of the diaphragm forces the liquid out of the accumulator pressure chamber and compensates for the loss of pressure of the liquid in the pressure chamber by reason of escape or removal of a part of such liquid from the liquid pressure chamber.

In proceeding in accordance with the present invention the reservoir is composed of two complementary dome-like sections or shells, 1 and 2, which conjointly form a reservoir and are secured together by a ring or band 3, which encircles same and extends across their line of juncture 6, as depicted in Fig. 2. The band has its opposed edges 4, of undulating form to facilitate welding thereof, as indicated at 5 to the sections 1 and 2, thereby to permanently unite the sections to virtually constitute a one-piece structure, and to seal the joint 6 therebetween. However, and as depicted in Fig. 4, in lieu of making the reservoir in sections, same can be spun in a single piece.

A flanged collar 7 is secured to the section 2 preferably by welding as indicated at 8, and has its flange formed with an outwardly facing groove 9. A plug 10 is threaded into engagement with the collar 7 and is formed with a groove 11 complementary to the groove 9, the plug being also formed with a central threaded opening 12 for receiving a connection to conduct the liquid under pressure to the mechanism to be actuated. The section 1 is provided with a flanged collar 13 similar to collar 7, the flange being provided with a groove 14 corresponding to the groove 11 of the flange of collar 7.

A removable closure 15 is threaded into engagement with the collar 13 and is provided with a groove 17 complementary to groove 14 as in the instance of the complementary grooves 9 and 11 at the outlet end of the reservoir.

A liner formed of soft flexible rubber or suitable composition material is provided, and is composed of a lower section 18 and upper section 19, the sections conjointly forming a globe-like or balloon structure which as depicted in Fig. 2, conformably engages the internal walls of the sections 1 and 2.

The liner is formed with diametrically opposed necks terminating in beads 20 and 21, which latter conformably engage in the seats provided by the complementary grooves 9 and 11, and 14 and 17 respectively. As clearly evidenced in Fig. 2 the projecting parts 22 and 23 of the collars respectively provide annular anchoring parts over or about which the necks of the liner engage so that upon rotation of the collars 10 and 15, same will engage and compress the beads 20 and 21 respectively thus to not only securely hold the liner in position, but at the same time to provide an effective seal against the egress of the fluid from the pressure compartments.

The liner is formed with an integral diaphragm 24 connected to the latter at points adjacent the joint between the sections 1 and 2, by enlarged portions 24, which render the anchorage of the diaphragm to the liner of greater strength and effectiveness. The liner and diaphragm are molded to form a one-piece or integral structure.

For the purpose of preventing the diaphragm from entering the outlet when subjected to pressure, a metal or equivalent disk 25 is secured to the center of the diaphragm, by means of a stem 26 connected to the disk and extending through the diaphragm, the stem having a corresponding disk 27 threaded thereon and impinged against the center of the diaphragm as clearly illustrated in Fig. 2.

In Fig. 3, a modified form of the invention is illustrated wherein a collar 28 is provided and extends through an opening 29 provided therefor in the section 30, the collar being formed with an outwardly extending tapered flange 31, which latter is disposed interiorly of the reservoir and engages the inner face of the section 30, the collar being welded as illustrated at 31 to section 30. Thus in this form of the invention the flange of the collar lies within the reservoir as distinguished from the form of the invention shown in Figs. 1 and 2, in which the collar is disposed exteriorly of the reservoir. Otherwise the structure is identical with that shown in Figs. 1 and 2, and obviously is applicable to both ends of the reservoir in lieu of the collars shown in Figs. 1 and 2.

Since the invention aims to provide for removal of the liner and its diaphragm from the reservoir by drawing therefrom in a collapsed state through either the reservoir inlet or outlet, the latter are formed of a size to permit withdrawal without injury to the liner or its diaphragm.

In assemblage, the plugs 10 and 15 are removed and the liner and its diaphragm collapsed, and then inserted in the reservoir by threading same through either the inlet or outlet, following which the necks of the liner are positioned about the parts of the collars that project within the reservoir, the beads placed in their seats, and finally the plugs threaded into the position depicted in Fig. 2. To remove the liner and its diaphragm, the plugs are removed, the beads moved out of their seats, and the liner and diaphragm collapsed by and in drawing same through either the inlet or outlet.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

What is claimed is:

1. A pressure accumulator including a pair of half shells, means to secure the shells together to form a reservoir, one shell being formed with an inlet and the other with an outlet, a liner for the reservoir having opposed necks, a diaphragm connected to the liner to divide the reservoir into a pair of compartments, and means for removably connecting the necks to the inlet and outlet respectively, said liner and diaphragm being collapsible and said inlet and outlet being of such size so that upon release of said connecting means for the necks of the liner and upon collapse of the liner and diaphragm same may be drawn through either the inlet or outlet and thereby completely removed from the reservoir.

2. A pressure accumulator including a pair of half shells, means to secure the shells together to form a reservoir, one shell being formed with an inlet and the other with an outlet, a liner for the reservoir having opposed necks, a diaphragm connected to the liner to divide the reservoir into a pair of compartments, annular beads on the liner necks, internally threaded collars surrounding the inlet and outlet respectively, and plugs threaded into engagement with the collars, the collars and plugs being formed with annular complementary grooves forming seats to receive the respective beads of the liner necks, said liner and diaphragm being collapsible and said inlet and outlet being of such size so that upon release of said connecting plugs for the necks of the liner and upon collapse of the liner and diaphragm same may be drawn through either the inlet or outlet and thereby completely removed from the reservoir.

3. A pressure accumulator including a pair of half shells, means to secure the shells together to form a reservoir, one shell being formed with an inlet and the other with an outlet, a liner for the reservoir having opposed necks, a diaphragm connected to the liner to divide the reservoir into a pair of compartments, means carried by the central portion of the diaphragm to prevent entry thereof into the outlet upon the diaphragm being subjected to fluid pressure, and means for removably connecting the necks to the inlet and outlet respectively, said liner and diaphragm being collapsible and said inlet and outlet being of such size so that upon release of said connecting means for the necks of the liner and upon collapse of the liner and diaphragm same may be drawn through either the inlet or outlet and thereby completely removed from the reservoir.

4. A pressure accumulator including a pair of half shells, means to secure the shells together to form a reservoir, one shell being formed with an inlet and the other with an outlet, a liner for the reservoir having opposed necks, a diaphragm connected to the liner to divide the reservoir into a pair of compartments, a disk carried by the central portion of the diaphragm and confronting the outlet to prevent entry of the diaphragm into the outlet upon the diaphragm being subjected to fluid pressure, and means for removably connecting the necks to the inlet and outlet respectively, said liner and diaphragm being collapsible and said inlet and outlet being of such size so that upon release of said connecting means for the necks of the liner and upon collapse of the liner and diaphragm same may be drawn through either the inlet or outlet and thereby completely removed from the reservoir.

5. A pressure accumulator including a substantially globe-like reservoir provided with ports, a liner having portions communicating with the respective ports, a diaphragm carried by the liner, and means to removably secure the liner within the reservoir, said liner and diaphragm being collapsible and at least one of the ports being of a size so that upon collapse of the liner same is removable from the reservoir therethrough.

6. A pressure accumulator including a substantially globe-like reservoir provided with ports, and composed of a pair of substantially dome-like sections permanently and rigidly secured together so as to constitute a substantially one-piece structure, a liner having portions communicating with the respective ports, a diaphragm carried by the liner, and means to removably secure the liner within the reservoir, said liner and diaphragm being collapsible and at least one of the ports being of a size so that upon collapse of the liner same is removable from the reservoir therethrough.

7. A pressure accumulator including a pressure storage reservoir, and a liner for the reservoir having a diaphragm connected thereto to divide the reservoir into two compartments.

8. A pressure accumulator including a pressure storage reservoir, and a liner for the reservoir having a diaphragm connected thereto to divide the reservoir into two compartments, said reservoir having an opening, and said liner and diaphragm being collapsible so as to be insertible in and withdrawable through said opening.

WARREN H. CLARK.